Aug. 5, 1924.

W. O. LYTLE 1,503,543

GLASS THICKNESS GAUGE

Filed Aug. 7, 1923          3 Sheets-Sheet 1

INVENTOR
W. O. Lytle
by
James C. Bradley
atty

Aug. 5, 1924.
W. O. LYTLE
1,503,543
GLASS THICKNESS GAUGE
Filed Aug. 7, 1923   3 Sheets-Sheet 2
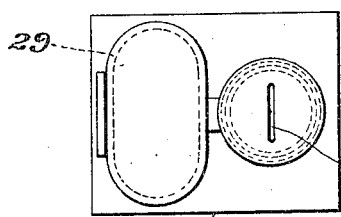
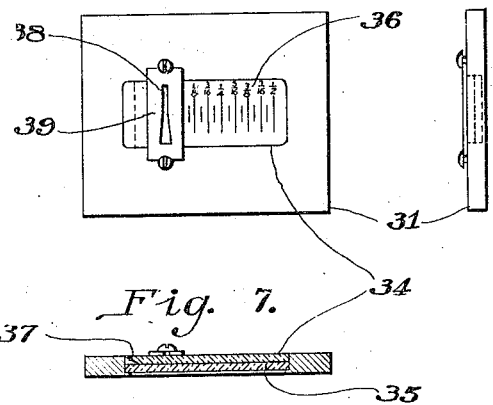
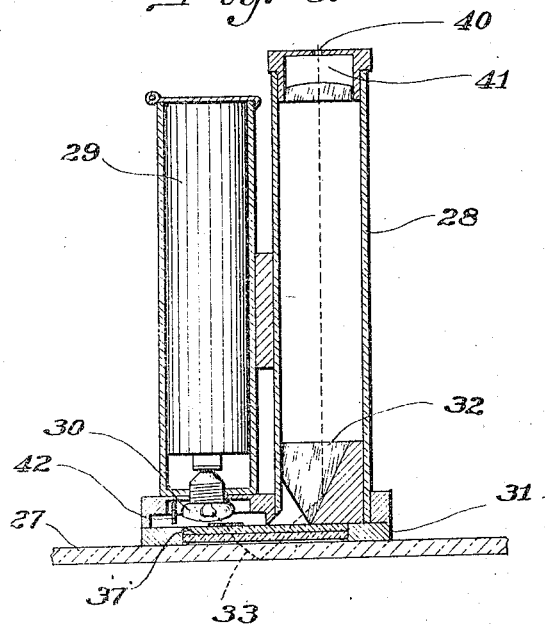
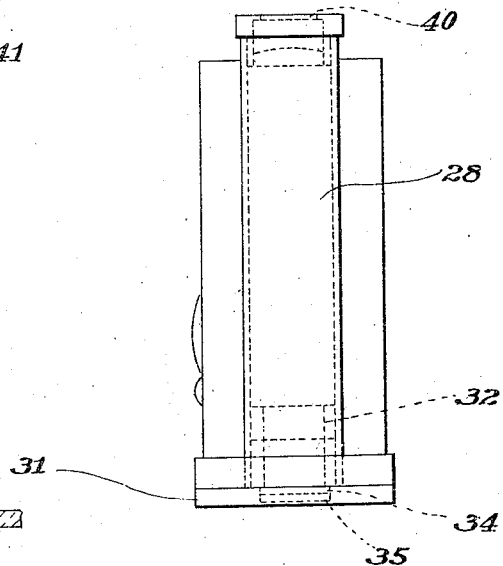
INVENTOR
W. O. Lytle
by
James C. Bradley
atty Aug. 5, 1924.
W. O. LYTLE
1,503,543
GLASS THICKNESS GAUGE
Filed Aug. 7, 1923
3 Sheets-Sheet 3
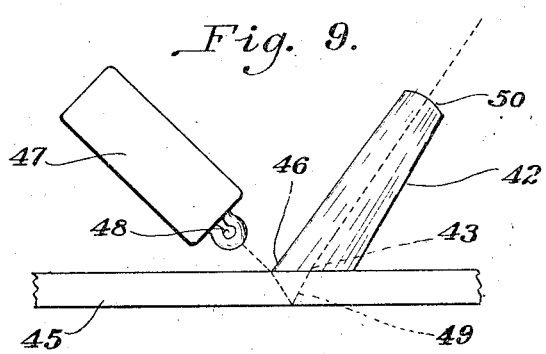
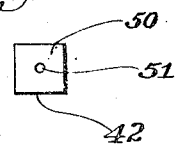
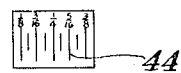
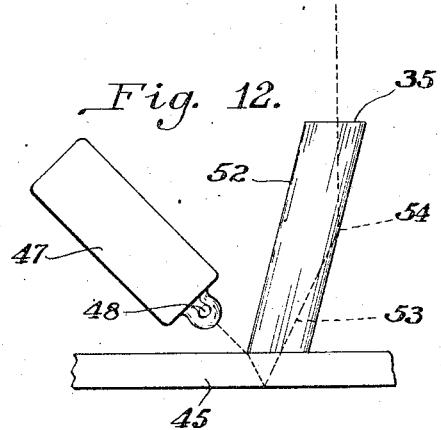
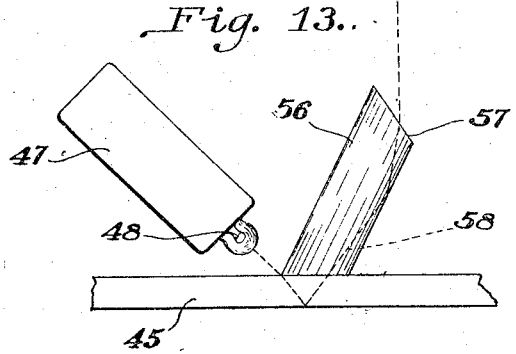
INVENTOR Patented Aug. 5, 1924.

1,503,543

UNITED STATES PATENT OFFICE.

WILLIAM ORLAND LYTLE, OF FORD CITY, PENNSYLVANIA, ASSIGNOR TO PITTS-BURGH PLATE GLASS COMPANY, A CORPORATION OF PENNSYLVANIA.

GLASS-THICKNESS GAUGE.

Application filed August 7, 1923. Serial No. 656,224.

*To all whom it may concern:*

Be it known that I, WILLIAM ORLAND LYTLE, a citizen of the United States, and a resident of Ford City, in the county of Armstrong and State of Pennsylvania, have made a new and useful invention in Improvements in Glass-Thickness Gauges, of which the following is a specification.

Figure 1:
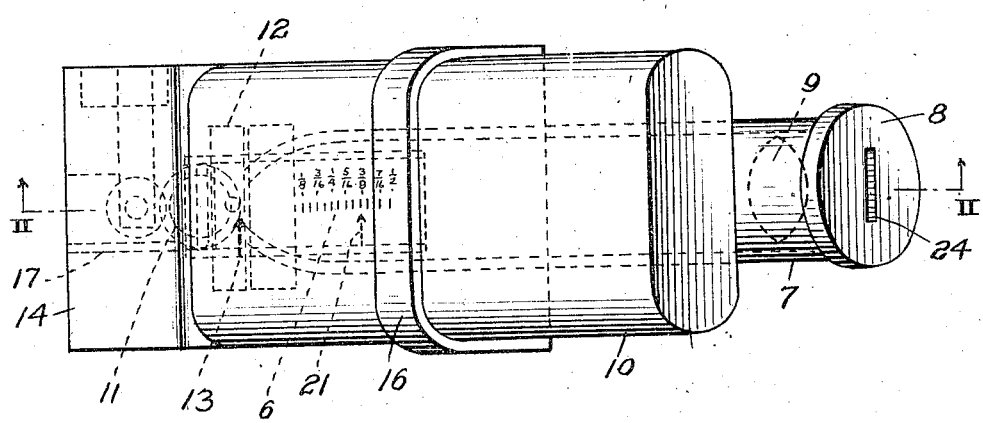
Figure 2:
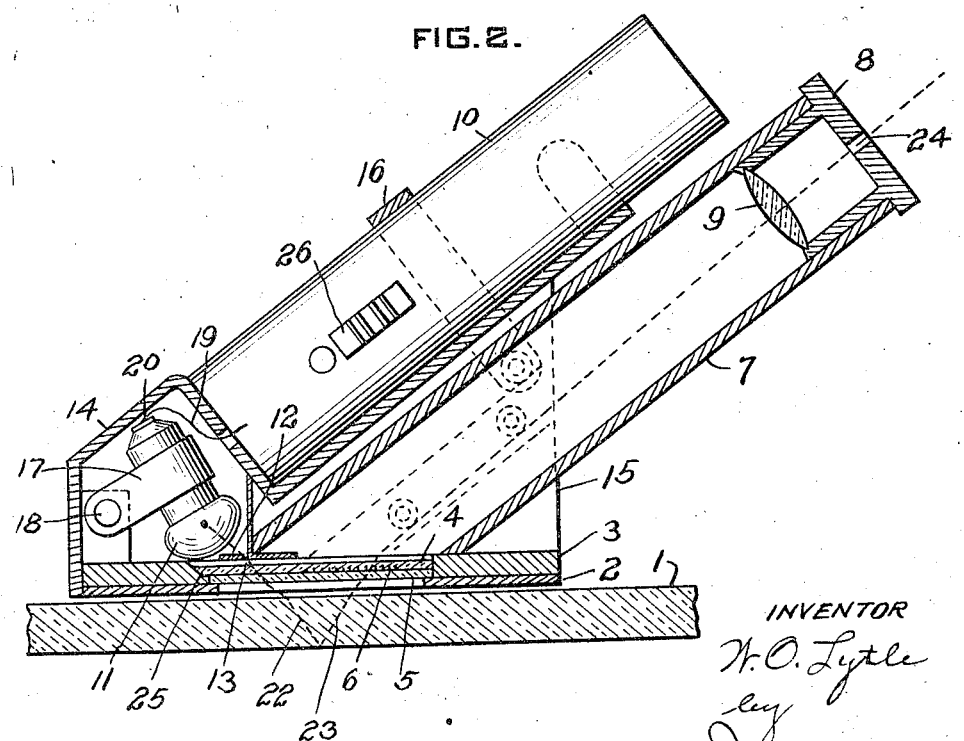

The invention relates to a device for indicating the thickness of sheet glass, and has for its primary object the provision of a simple device by means of which the thickness of a glass sheet may be accurately determined at any point by merely applying the gauge to the top surface of the sheet, and observing the reading on the scale of the device. Briefly stated, this is accomplished by an optical method, a beam of light being projected downwardly through the glass sheet at an angle thereto, and then reflected upwardly from the lower surface of the glass onto the scale of the instrument, which may be observed through an eye piece. The point at which the reflected light strikes the scale will vary directly as the distance of the lower reflecting surface of the glass from the scale, so that by calibrating the length of the scale graduation, direct and accurate readings may be obtained as to the thickness of the glass sheet. One embodiment of the invention is illustrated in the accompanying drawings wherein:

Figure 1 is a plan view of the apparatus. Fig. 2 is a section on the line II—II of Fig. 1 showing the device in use. Fig. 3 is a vertical section through a modification. Fig. 4 is a side elevation of the Fig. 3 construction. Fig. 5 is a plan view. Figs. 6, 7 and 8 are detailed views on an enlarged scale of the base plate of the device of Fig. 4. Fig. 9 is a side elevation of a modification. Fig. 10 is a plan view of the lower end of the observation element of Fig. 9. Fig. 11 is a plan view of the upper end of the observation element of Fig. 9. And Figs. 12 and 13 are side elevations of still other modifications.

Referring to the drawings, 1 is a plate of glass whose thickness is to be measured; 2 is a metal plate constituting a portion of the base of the apparatus and adapted to contact with the upper surface of the glass plate 1; 3 is a plate having a window or opening therethrough in which are mounted the transparent plates 4 and 5, the first of which is provided with a scale 6 (Fig. 1); 7 is an observation tube provided with the cap 8 carrying the magnifying lens 9; 10 is a battery; 11 is an electric light; and 12 is a sheet of copper or other opaque material provided with a slot 13 for the passage of a beam of light from the lamp through the plate 1 whose thickness is to be gaged.

Secured to the base are a pair of supporting members 14 and 15 for carrying the tube 7, battery 10 and the lamp 11, the battery being clamped in position by means of the strap member 16 and the lamp by means of the clamp 17 pivoted to the member 14 as indicated at 18. Suitable connections from the battery to the lamp terminals are made, one of which, the wire 19 is indicated as attached to the contact strip 20 opposite the end of the lamp.

The slot 13 in the member 12 is preferably made in the form of an arrow as indicated in Fig. 1, and is positioned so that the light passing through this slot will be shown on the glass plate 4 which carries the scale at the side of such scale as indicated by the dotted arrow at 21 in Fig. 1. The beam of light traveling down through the plate 1 is indicated in Fig. 2 by the line 22, while the reflected beam is indicated by the line 23. It will be seen that the point at which the beam 23 engages the scale plate 4 will depend upon the thickness of the plate 1. The thicker the plate, the further to the right will be the point at which the beam of light passes through the scale plate. By properly calibrating the graduations, direct readings as to the thickness of the glass plate to which the instrument is applied may be secured. On the scale, as illustrated, the graduations are in thirty-seconds of an inch.

The scale is observed through the tube 7 which is blackened upon its interior and provided with the eye piece having the slot 24, the lens 9 serving to magnify the scale and increase the clearness of the observation. In order to illuminate the scale, the end of the scale plate 4 is a polished bevel as indicated at 25, and is so positioned that a beam of light from the lamp 11 strikes this bevel and is reflected longitudinally through the plate 4. This is a valuable feature, in that it makes the scale visible even against a black background, such as a cutting table top.

In use the instrument is placed upon a sheet of glass to be measured as indicated in Fig. 2 and the thumb piece 26 of the battery is operated to switch on the current to the lamp 11. This gives the beam of light 22 which strikes the lower surface of the plate 1 and is reflected along the line 23 to the scale plate, where the beam of light shows up in the form of the arrow 21 (Fig. 1) which may be readily observed through the slot 24 of the observation tube 7, the clearness of the observation being increased by the reason of the light reflected longitudinally of the scale plate by means of the bevel 25 as heretofore explained. The thickness of the sheet at any point may thus be readily determined, and the reading may be made as close as one hundredth of an inch or better if desired.

In the modification illustrated in Figs. 3 to 8, provision is made whereby the observation tube may be set at an angle of 90 degrees to the glass plate 27 whose thickness is to be gaged. In this construction, 28 is the observation tube; 29 is the battery for the light 30; 31 is the base plate of the device; and 32 is a refracting member whereby the ray of light indicated by the dotted lines 33 is given a vertical path after it passes the member 32. As in the other construction, a pair of plates 34 and 35 are mounted in the base 31, the lower face of the plate 34 being provided with the scale 36. The end of the plate 34 is provided with a bevel 37 corresponding in function to the bevel 25 described in connection with the first form of device. The indicating means in this construction is in the form of a slot 38 in the plate 39, the ray of light 36 passing through such slot and being reflected upward through the scale and through the refracting member 32 so that it may be observed through the slot 40 in the eye piece 41. In this construction a small mirror 42 is also employed for increasing the illumination in the plate 34.

Figs. 9 and 10 illustrate a very simple form of apparatus embodying the invention. The observation member in this case consists of a prism 42 which has its lower polished face 43 provided with the scale 44 (Fig. 10) and in engagement with the top surface of the glass plate 45 which is to be measured. In this construction the indicating means is the toe 46 of the prism 42. The ray of light is provided from the flash light 47 having the bulb 48, and the ray of light 49 follows the path indicated in dotted lines in Fig. 9. In order to magnify the scale, the upper end of the prism is provided with a convex surface 50 and on this surface at the center thereof is a small circle or mark 51 which serves to establish the line of sight. This form of device is not quite so easily read as the other two heretofore described, but is advantageous because of its small size and simplicity.

Fig. 12 is a modification corresponding closely to that of Fig. 9, but having a slightly different observation element 52. The angle of this element is so arranged that the ray of light 53 strikes against the polished surface 54 and is then reflected vertically through the upper surface 55 of the observation element, this surface being flat in this construction and polished and having a mark thereon corresponding to the mark 51 in the Fig. 9 construction.

Fig. 13 illustrates still another modification in which the angle of the observation element 56 is different from that of Fig. 12 and the upper polished surface 57 of the element lies at an angle to the horizontal instead of being parallel thereto. The dotted line 58 indicates the line of travel of the ray of light.

What I claim is:

1. In combination, a glass thickness gauge comprising an observation member adapted to be placed with its base upon the plate of glass whose thickness is to be measured, a transparent scale extending transversely of the observation member at its base in parallelism with the surface of the glass plate, an indicating means opposite one end of the scale, and a source of illumination above the indicating means, the relation of the indicating means and scale being such that a beam of light from the source of illumination will pass the indicating means and be reflected upward from the lower surface of said plate onto the scale, showing such means upon the scale.

2. In combination, a glass thickness gauge comprising a base for engaging the plate to be gaged provided with a transparent sheet having a scale, an observation member mounted on the base over said transparent sheet, an opaque member provided with a slit at one end of the transparent sheet, and a source of illumination above the slit, the relation of the slit and scale being such that a beam of light passing from the source of illumination through the slit will strike the lower surface of said plate and be reflected upward onto said transparent sheet having the scale.

3. In combination, a glass thickness gauge comprising a base for engaging the plate to be gaged provided with a transparent sheet having a scale, an observation member mounted on the base over said transparent sheet, an opaque member provided with a slit at one end of the transparent sheet, a reflecting surface at one end of the transparent sheet, and a source of illumination above said slit and said reflecting surface, the relation of the slit and scale being such that a beam of light passing from the source of illumination through the slit will strike the lower surface of said plate and be reflected upward onto said transparent sheet having the scale, and the angle of said reflecting surface being such that light from source of illumination impinging thereon will be directed longitudinally through the transparent sheet and illuminate it.

4. In combination, a glass thickness gauge comprising a base for engaging the plate to be gaged provided with a transparent sheet having a scale, an observation member mounted on the base over said transparent sheet, an opaque member provided with a slit at one end of the transparent sheet, a beveled reflecting surface on the end of the transparent sheet, and a source of illumination above the slit, the relation of the slit and scale being such that a beam of light passing from the source of illumination through the slit will strike the lower surface of said plate and be reflected upward onto said transparent sheet having the scale.

In testimony whereof, I have hereunto subscribed my name this 25th day of June, 1923.

W. ORLAND LYTLE.